United States Patent
Kiernan et al.

(10) Patent No.: US 11,681,380 B2
(45) Date of Patent: Jun. 20, 2023

(54) ADAPTIVE ELECTRODE ARRANGEMENT IN A CAPACITIVE SENSE ARRAY

(71) Applicant: PARADE TECHNOLOGIES, LTD., San Jose, CA (US)

(72) Inventors: Andrew Kiernan, Lynnwood, WA (US); Frederick Jaccard, Woodinville, WA (US); Pete Vavaroutsos, San Jose, CA (US)

(73) Assignee: PARADE TECHNOLOGIES, LTD., San Jose, CA (US)

( * ) Notice: Subject to any disclaimer, the term of this patent is extended or adjusted under 35 U.S.C. 154(b) by 412 days.

(21) Appl. No.: 16/118,294

(22) Filed: Aug. 30, 2018

(65) Prior Publication Data

US 2019/0064969 A1   Feb. 28, 2019

Related U.S. Application Data

(60) Provisional application No. 62/553,052, filed on Aug. 31, 2017.

(51) Int. Cl.
  *G06F 3/044* (2006.01)
  *G06F 3/0354* (2013.01)
  *G06F 3/041* (2006.01)

(52) U.S. Cl.
  CPC ........ *G06F 3/03545* (2013.01); *G06F 3/0412* (2013.01); *G06F 3/0445* (2019.05); *G06F 3/0446* (2019.05); *G06F 3/04164* (2019.05); *G06F 3/04166* (2019.05); *G06F 2203/04107* (2013.01); *G06F 2203/04112* (2013.01)

(58) Field of Classification Search
  CPC . G06F 2203/04107; G06F 2203/04112; G06F 3/03545; G06F 3/0412; G06F 3/0414; G06F 3/0416; G06F 3/044
  See application file for complete search history.

(56) References Cited

U.S. PATENT DOCUMENTS

| | | | |
|---|---|---|---|
| 2008/0252608 A1* | 10/2008 | Geaghan | G06F 3/044 345/173 |
| 2010/0188312 A1* | 7/2010 | Ohdachi | H04N 5/44591 345/1.1 |
| 2010/0309162 A1* | 12/2010 | Nakanishi | G06F 3/03547 345/174 |
| 2012/0044198 A1* | 2/2012 | Chai | G06F 3/044 345/174 |
| 2012/0044199 A1* | 2/2012 | Karpin | G06F 3/0416 345/174 |
| 2013/0181943 A1* | 7/2013 | Bulea | G06F 3/044 345/174 |

(Continued)

*Primary Examiner* — Temesghen Ghebretinsae
*Assistant Examiner* — Sosina Abebe
(74) *Attorney, Agent, or Firm* — Morgan, Lewis & Bockius LLP

(57) ABSTRACT

This application is directed to a capacitive sense array including a two-dimensional array of capacitive sense elements. Each capacitive sense element is formed by a respective intersection of (i) a respective row electrode in a first electrode layer and (ii) a respective column electrode in a second electrode layer. Each column of the capacitive sense elements includes two or more interdigitated column electrodes. Each row electrode forms two or more rows of capacitive sense elements at intersections with the column electrodes.

20 Claims, 8 Drawing Sheets

(56) References Cited

U.S. PATENT DOCUMENTS

| | | | |
|---|---|---|---|
| 2013/0307789 A1* | 11/2013 | Karamath | G06F 3/016 345/173 |
| 2015/0193081 A1* | 7/2015 | Liu | G06F 3/0418 345/174 |
| 2015/0309531 A1* | 10/2015 | Tanemura | G06F 1/16 345/174 |
| 2016/0291721 A1* | 10/2016 | Shepelev | G06F 3/044 |
| 2017/0068354 A1* | 3/2017 | Meng | G06F 3/0446 |
| 2018/0011537 A1* | 1/2018 | Agari | G06F 3/0446 |

* cited by examiner

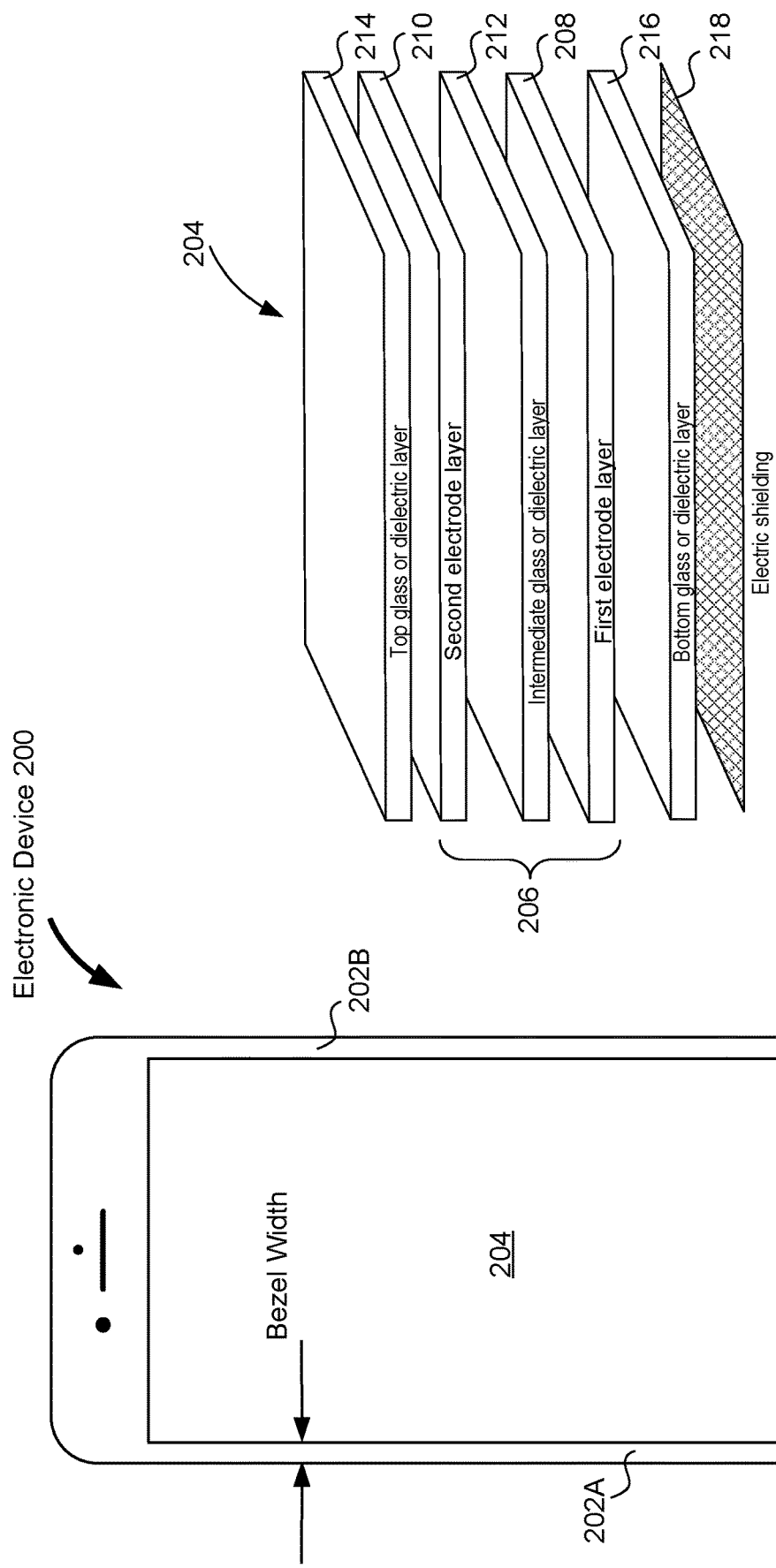

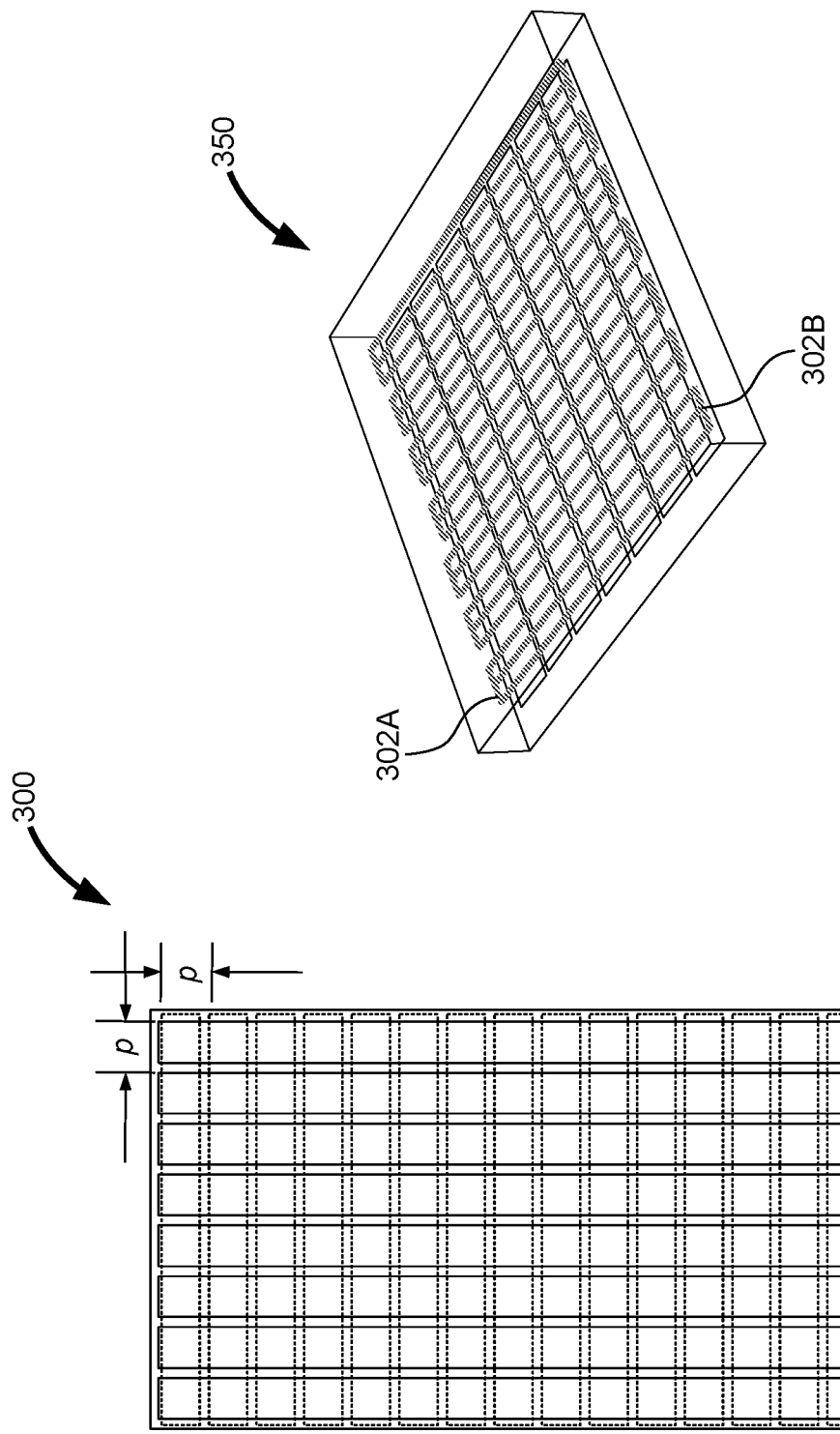

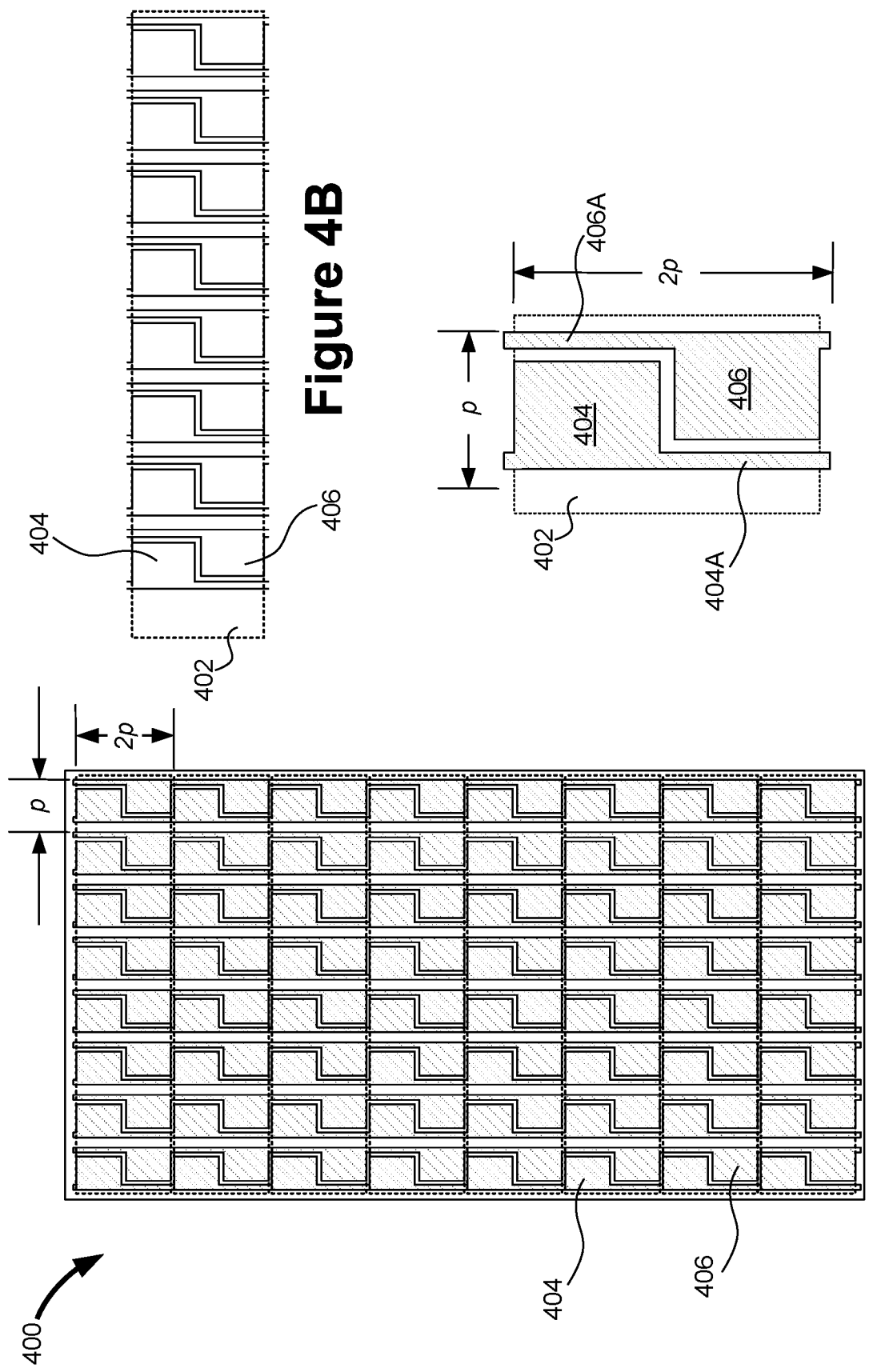

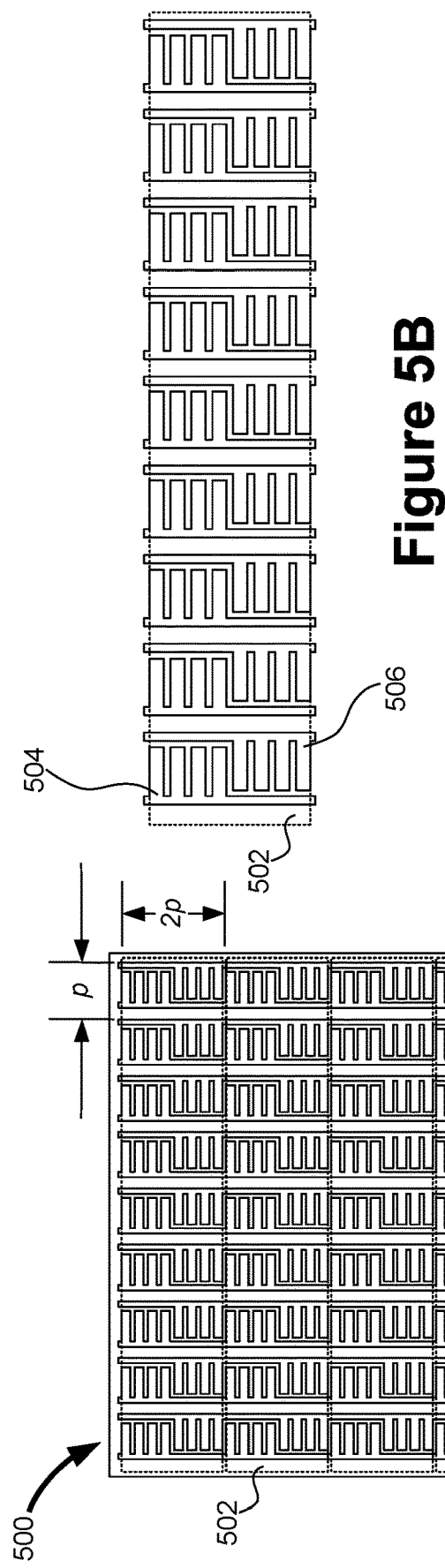
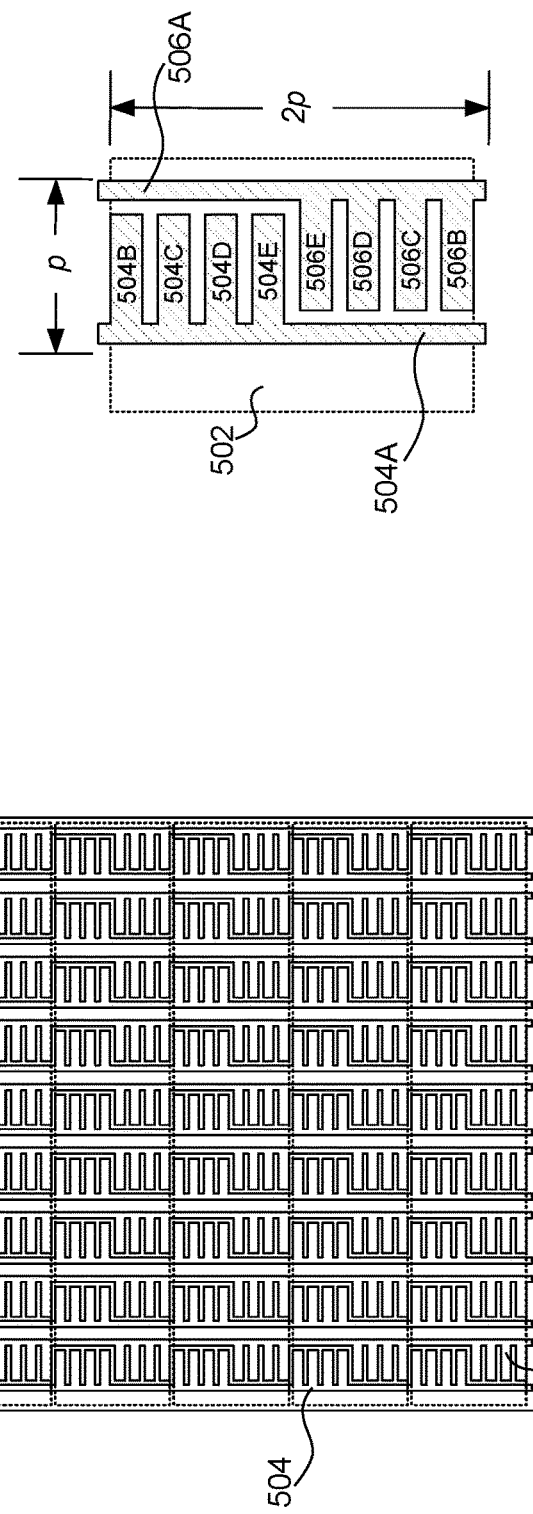
Figure 5B
Figure 5C
Figure 5A

ADAPTIVE ELECTRODE ARRANGEMENT IN A CAPACITIVE SENSE ARRAY

CROSS REFERENCE TO RELATED APPLICATION

This application claims priority to U.S. Provisional Patent Application No. 62/553,052, titled "Sensor Design for Narrow bezel Touch Panel," filed on Aug. 31, 2017, which is hereby incorporated by reference in its entirety.

TECHNICAL FIELD

The disclosed implementations relate generally to touch detection in a display device, including methods and systems for adaptively arranging row electrodes and column electrodes of a capacitive sense array to fit corresponding routing interconnects within a substantially narrow bezel of the display device.

BACKGROUND

Touch sensitive display screens that utilize capacitive sense arrays are widely applied in today's industrial and consumer markets. They can be found in cellular phones, GPS devices, set-top boxes, cameras, computer screens, MP3 players, digital tablets, and the like. A capacitive sense array includes an array of capacitive sense elements and is electrically coupled to an electrical circuit for detecting touches associated with the capacitive sense array. Self or mutual capacitance associated with a capacitive sense element varies when a conductive object (e.g., a finger, hand, or other object) comes into contact or close proximity with the capacitive sense element. The electrical circuit coupled to the capacitive sense array is configured to measure the capacitance of individual capacitive sense elements and to look for a variation of capacitance indicating a touch or presence of the conductive object. One or more touch locations on the entire capacitive sense array can be determined according to the capacitance changes of all of the capacitive sense elements in the capacitive sense array.

In touch display screens, the capacitive sense elements are typically hard-wired to an edge area where the electrical circuit for detecting touch on the capacitive sense array can be accessed. However, this arrangement is at odds with a technological trend to create a large display screen having a substantially narrow bezel in many state-of-the-art consumer electronics devices (e.g., a bezel-less mobile phone). In particular, when the resolution of the capacitive sense array is substantially large, the need to wire the capacitive sense elements to an edge area becomes a challenge because of the large number of wires that have to fit in the narrow bezel of the touch sensitive display screen in order to access the electrical circuit.

SUMMARY

Various implementations of systems, methods and devices within the scope of the appended claims each have several aspects, no single one of which is solely responsible for the attributes described herein. After considering this disclosure, one will understand how the aspects of various implementations are used to reconfigure electrodes of a capacitive sense array for the purposes of fitting routing interconnects to a touch display screen of a display device within a substantially narrow edge (also called a bezel) of the display device.

In one aspect, this application discloses a capacitive sense array including a two-dimensional array of capacitive sense elements. Each capacitive sense element is formed by a respective intersection of (i) a respective row electrode in a first electrode layer and (ii) a respective column electrode in a second electrode layer. Each column of the capacitive sense elements includes n interdigitated column electrodes, where n is a positive integer greater than 1 (e.g., n=2). Each row electrode forms n rows of capacitive sense elements at intersections with the column electrodes.

In some implementations, at least a subset of the row electrodes in the first electrode layer are configured to be accessed from a first edge of the capacitive sense array, and the column electrodes in the second electrode layer are configured to be accessed from a second edge of the capacitive sense array, where the second edge is perpendicular to the first edge. Further, in some implementations, the capacitive sense array further includes a first plurality of routing traces disposed on the first edge to access the subset of the row electrodes of the array of capacitive sense elements. The first plurality of routing traces is configured to electrically couple a touchscreen controller to the row electrodes of the array of capacitive sense elements. In some implementations, the capacitive sense array further includes a second plurality of routing traces disposed on the second edge to access the column electrodes of the array of capacitive sense elements. The routing traces in the second plurality are configured to electrically couple the touchscreen controller to the column electrodes of the array of capacitive sense elements.

Further, in some implementations, the capacitive sense array is arranged under a display screen having a bezel width, and the first edge of the capacitive sense array corresponds to the bezel width of the display screen. The array of capacitive sense elements includes a first number of row electrodes. The first plurality of routing traces has a feature trace width and the routing traces are separated by spacing having a feature spacing size. The first number is determined according to the bezel width, the feature trace size, and the feature spacing size. In some implementations, the first edge has a width that can accommodate access to at most a threshold number of row electrodes. The first number is equal to or less than the threshold number, and a product of the first number and n is greater than the threshold number. In some implementations, the display screen has an aspect ratio that is greater than 16:9.

In some implementations, the first electrode layer and the second electrode layer are substantially transparent.

In some implementations, each row electrode in the first electrode layer corresponds to a two-dimensional sub-array of capacitive sense elements having n rows of capacitive sense elements. In some implementations n is equal to 2. When n=2, the two-dimensional sub-array of capacitive sense elements has two rows of sense elements. The column electrodes have an identical shape, and each column electrode has a 180-degree rotational symmetry with respect to each neighboring column electrode. In some implementations, each column electrode extends from a first routing trace to cover at least part of a first half of the height of each row electrode, and interleaves with a respective neighboring column electrode. The respective neighboring column electrode extends from a second routing trace to cover at least part of the second half of the height of each row electrode that is complementary to the first half of the height of each row electrode. In some implementations, for each row electrode, a portion of each column electrode includes a plurality of finger elements that extend from the first routing trace to cover the at least part of the first half of the height of the corresponding row electrode.

In some implementations, n is equal to or greater than 3, and the two-dimensional sub-array of capacitive sense elements has three or more rows of sense elements, each covering at least part of a height of the respective row electrode. Further, in some implementations, the column routing layer includes a plurality of interconnect sets. Each interconnect set includes n column interconnects that are electrically coupled to the n rows of capacitive sense elements corresponding to each row electrode.

In some implementations, a capacitance sense circuit is configured to be electrically coupled to the capacitive sense array, and measure self capacitance at each of the row and column electrodes to detect a touch event on the capacitive sense array. Alternatively, in some implementations, a capacitance sense circuit is configured to be electrically coupled to the capacitive sense array, and measure mutual capacitance of at least one of the plurality of sense elements to detect a touch event on the capacitive sense array. In some implementations, the capacitance sense circuit is configured to drive a first row electrode with a transmit signal, and measure an output signal at each column electrode to determine a mutual capacitance between the first row electrode and each of the column electrodes.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 2A is an example electronic device having a bezel surrounding an active display area of a touch display screen in accordance with some implementations.

FIG. 2B is an exploded view of the touch display screen of the electronic device in FIG. 2A, including a plurality of structural layers in accordance with some implementations.

FIG. 3A is a top view of an example capacitive sense array integrated in a touch display screen of an electronic device in accordance with some implementations.

FIG. 3B is a perspective view of an example capacitive sense array integrated in a touch display screen of an electronic device in accordance with some implementations.

FIG. 4A is a top view of an example capacitive sense array integrated in a touch display screen of an electronic device in accordance with some implementations.

FIG. 4B is a two-dimensional sub-array of capacitive sense elements corresponding to a row electrode of the example capacitive sense array shown in FIG. 4A in accordance with some implementations.

FIG. 4C is a pair of capacitive sense elements in the example capacitive sense array shown in FIG. 4A in accordance with some implementations.

FIG. 5A is a top view of an example capacitive sense array integrated in a touch display screen of an electronic device in accordance with some implementations.

FIG. 5B is a two-dimensional sub-array of capacitive sense elements corresponding to a row electrode of the example capacitive sense array shown in FIG. 5A in accordance with some implementations.

FIG. 5C is a pair of sense elements in the example capacitive sense array shown in FIG. 5A in accordance with some implementations.

Like reference numerals refer to corresponding parts throughout the several views of the drawings.

DESCRIPTION OF IMPLEMENTATIONS

Figure 1:
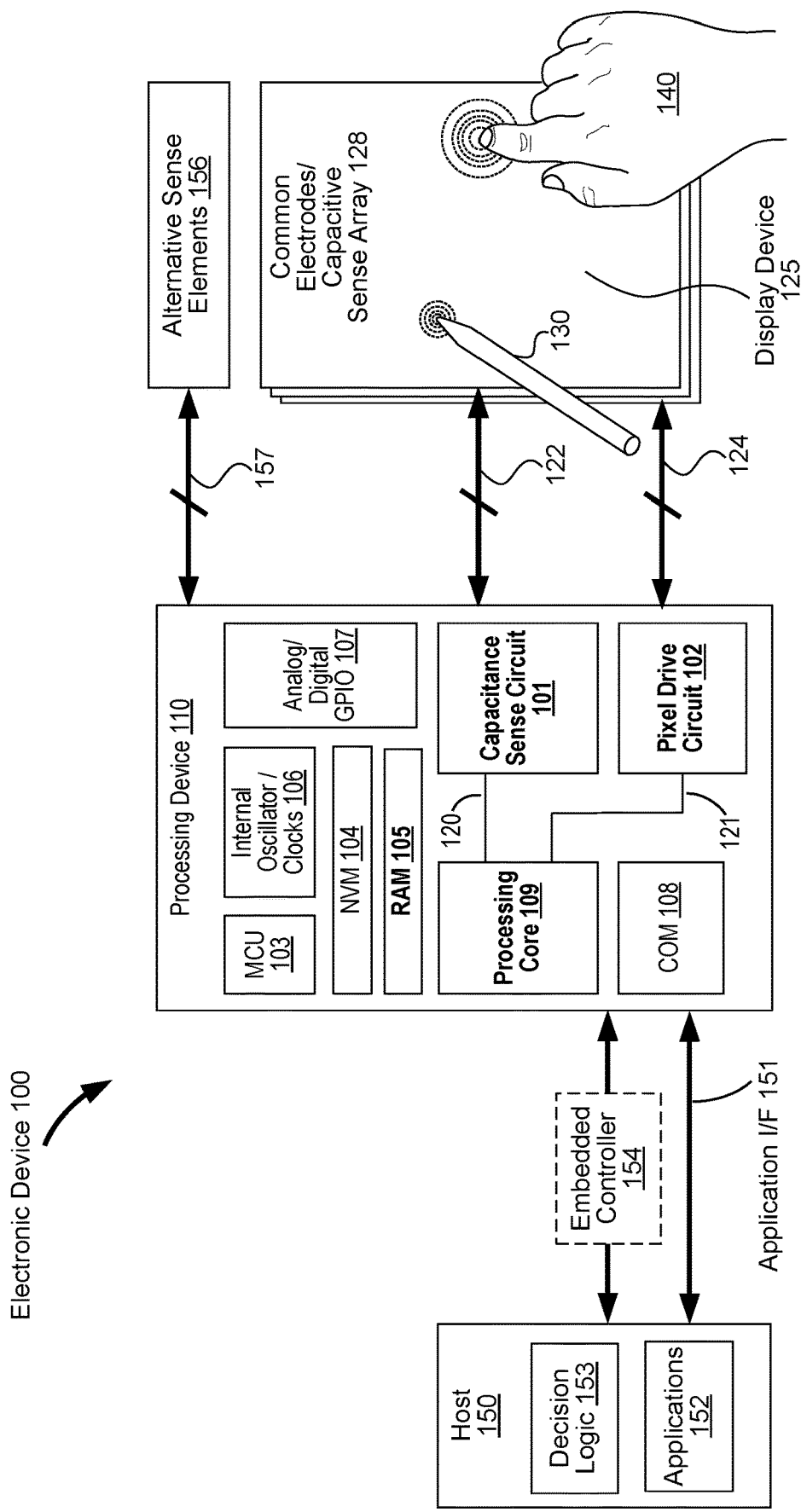
FIG. 1 is a block diagram illustrating an electronic device in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, mechanical structures, circuits, and networks have not been described in detail so as not to unnecessarily obscure aspects of the implementations.

In some implementations, a two-layer mutual capacitance sensor design is adopted to adaptively rearrange row and column electrodes in order to fit interconnects (also called routing traces) accessing the row electrodes in a bezel of a touch display screen. Specifically, a capacitive sense array includes a two-dimensional array of capacitive sense elements. Each capacitive sense element is formed by a respective intersection of (i) a respective row electrode in a first electrode layer and (ii) a respective column electrode in a second electrode layer. Each column of the capacitive sense elements includes n interdigitated column electrodes, where n is a positive integer greater than 1. Each row electrode forms n rows of capacitive sense elements at intersections with the column electrodes.

In an example, the capacitive sense array has a 28×14 resolution, i.e., 28 rows and 14 columns of capacitive sense elements. A conventional sensor design has 28 row electrodes and 14 column electrodes, and a capacitive sense element is formed at each intersection of the row and column electrodes. This requires at least 28 row interconnects to connect the 28 rows to a touchscreen controller circuit (hybrid or integrated) located outside an active display area of the corresponding touch display screen, and the 28 row interconnects have to be arranged at a bezel adjacent to the active display area. In contrast, some implementations of this application reduce the number of row interconnects by half, i.e., to 14 row electrodes, thereby allowing the row interconnects to fit into a bezel having a width that is approximately half of the bezel width required by the conventional sensor design. In some implementations, mobile phones have an aspect ratio (e.g., 2:1) that is higher than a threshold aspect ratio (e.g., 16:9), and corresponding bezel widths can only fit a limited number of routing traces for these high aspect ratio mobile phones. In various implementations of this application, the number of row interconnects are reduced when the row interconnects keep their required widths and spacing (a reduction of interconnect width or spacing could compromise the yield and quality of the interconnects), and the reduced number of row interconnects can therefore fit into the corresponding bezel even when only two metal layers are applied to enable the row and column electrodes.

FIG. 1 is a block diagram illustrating an electronic device 100 in accordance with some implementations. The electronic device 100 includes a processing device 110 that is electrically coupled to a display device 125 having a display pixel array. The display pixel array further includes a plurality of display pixels driven between a plurality of display electrodes and one or more common electrodes. Each display pixel is disposed between a display electrode and a common electrode. The display device 125 further includes a capacitive sense array 128 including a two-dimensional array of capacitive sense elements. Each capacitive sense element is formed by a respective intersection of (i) a respective row electrode in a first electrode layer 208 and (ii) a respective column electrode in a second electrode layer 210.

The processing device 110 operates in two states including a display driving state and a touch sensing state. In the display driving state, a voltage bias is generated by the processing device 110 and applied between the display and common electrodes of each display pixel to enable display of a color on the respective display pixel. In the touch sensing state, the processing device 110 is configured to measure capacitance variations at the row and column electrodes and detect one or more touches on or proximate to a surface of the display device 125. In some implementations, the processing device 110 alternates between the display driving state and the touch sensing state according to a predetermined duty cycle (e.g., 80%) for the display driving state, and detects a contact with or a proximity to a touch sensing surface associated with the display pixel array at a distinct duty cycle, thereby avoiding interfering with display operations of the display pixel array during the predetermined duty cycle. In some implementations, the processing device 110 operates in the display driving state and the touch sensing state concurrently by two separate circuit blocks (e.g., a pixel drive circuit 102 and a capacitance sense circuit 101). These circuits implement display operations via the display pixel array and detect a contact with or a proximity to a touch sensing surface associated with the display pixel array.

In some implementations, the first and second electrode layers of the capacitive sense array 128 are distinct from the display electrode layer and the common electrode layer that are used to form the display and common electrodes driving the display pixel array. For example, the first and second electrode layers of the capacitive sense array 128 are above the display and common electrode layers. The display driving state is implemented via the display and common electrodes formed in the display and common electrode layers, independently of the touch detection state that is implemented via the row and column electrodes formed in the first and second electrode layers. In an example, the display and common electrodes of each display pixel are driven by a pixel drive circuit 102 to enable display of a color on the respective display pixel, concurrently when a capacitance sense circuit 101 measures capacitance variations on the row and column electrodes.

Alternatively, in some implementations, at least one of the first and second electrode layers of the capacitive sense array 128 is also used to form the display electrode or common electrode driving the display pixel array. In this case, the display drive state and the touch detection state are implemented sequentially during two distinct time slots or duty cycles. In the display driving state, the display and common electrodes of each display pixel are driven by the pixel drive circuit 102 to enable display of a color on the respective display pixel. In the touch sensing state, the display electrodes or common electrodes are reconfigured to the row or column electrodes of the capacitive sense array 128, and the capacitance sense circuit 101 is configured to measure capacitance variations at the row and column electrodes to detect one or more touches proximate to the surface of the display device 125. In some situations, the processing device 110 alternates between the display driving state and the touch sensing state according to the predetermined duty cycle for the display driving state.

The processing device 110 can detect conductive objects, such as touch objects 140 (e.g., a finger), a passive or active stylus 130, or any combination thereof when operating in the touch sensing state. The touch may be detected by a single or multiple sense elements, each element representing an isolated row or column electrode or an intersection of electrodes of the capacitive sense array 128. In some implementations, when the capacitance sense circuit 101 measures mutual capacitance of the capacitive sense array 128, the processing device 110 acquires a two dimensional capacitive image corresponding to a touch sensing object and processes the capacitive image data for peaks and positional information. In some implementations, the processing device 110 is coupled to a microcontroller (e.g., an external host device 150), which obtains a capacitance touch signal data set created from the capacitive sense array 128. In some implementations, finger detection firmware executing on the microcontroller identifies data set areas that indicate touches, detects and processes peaks, calculates the coordinates, or any combination thereof. The microcontroller can report the precise coordinates and other information to an application processor.

In some implementations, the electronic device 100 includes one or more of a processing device 110, a display device 125 (including a display pixel array), a stylus 130, and a host 150. The display device 125 may include a plurality of electrode layers made of conductive materials, such as copper. The plurality of electrode layers includes at least a first electrode layer and a second electrode layer that are configured to the capacitive sense array 128 including a two-dimensional array of capacitive sense elements. The plurality of electrode layers further includes a display electrode layer and a common electrode layer that are configured to drive an array of display cells disposed between the display and common electrode layers. In some implementations, the common electrode layer is formed below the array of display cells, and the display electrode layer is formed above the array of display cells. In some implementations, the first electrode layer, the second electrode layer, the display electrode layer, and the common electrode layer are distinct from each other. Alternatively, the display electrode layer is reconfigured to one of the first and second electrode layers during the corresponding touch detection state when capacitances of the capacitive sense array 128 are measured from capacitive sense elements formed by the first and second electrode layers. The plurality of electrode layers may also be part of an indium-tin-oxide (ITO) panel.

In the display driving state, the common electrodes of the display pixel array provide a bias voltage or a reference voltage to each display pixel of the display pixel array, thereby enabling display of a color on the respective display pixel. In the depicted implementation, the electronic device 100 includes the common electrodes coupled to the processing device 110 via a bus 124, and the common electrodes are configured to receive display driving signals from the processing device 110 via the bus 124. More specifically, the display driving signals are generated by a pixel drive circuit 102 of the processing device 110. Alternatively, in the touch sensing state, the capacitive sense elements of the capacitive sense array 128 can be used to allow the capacitance sense circuit 101 to measure self-capacitance, mutual capacitance, or any combination thereof. In the depicted implementation, the electronic device 100 includes the capacitive sense array 128 coupled to the processing device 110 via a bus 122, and the capacitive sense array 128 is configured to provide capacitive sense signals to a capacitance sense circuit 101 of the processing device 110 via the bus 122. The capacitive sense array 128 may include a multi-dimensional capacitive sense array. In some implementations, the multi-dimensional sense array includes multiple sense elements, organized as rows and columns. In some implementations, the capacitive sense array 128 has a flat surface profile. In some implementations, the capacitive sense array 128 has a non-flat surface profile. In some implementations, other configurations of capacitive sense arrays can be used. For example, instead of vertical columns and horizontal rows, the capacitive sense array 128 may have a diamond or hexagonal arrangement, or the like, as would be appreciated by one of ordinary skill in the art having the benefit of this disclosure.

In some implementations, the electronic device 100 further includes one or more force electrodes (not shown in FIG. 1) that are disposed below and separated from the capacitive sense array 128. The one or more force electrodes are electrically coupled to the processing device 110, and are configured to provide force signals to the processing device 110 for determining force associated with candidate touches detected from the capacitive sense array 128. In some implementations, the force signals are measured from capacitance variation associated with the one or more force electrodes, and used to improve accuracy of touch detection based on the capacitive sensing signals.

The operations and configurations of the processing device 110 and the capacitive sense array 128 for detecting and tracking a touch object 140 or a stylus 130 are described herein. In short, the processing device 110 is configured to detect the presence of a touch object 140, the presence of a stylus 130 on the capacitive sense array 128, or any combination thereof. If the touching object is an active stylus, the active stylus 130 is configured to operate as the timing "master," and the processing device 110 adjusts the timing of the capacitive sense array 128 to match that of the active stylus 130. In some implementations, the capacitive sense array 128 capacitively couples with the active stylus 130, as opposed to conventional inductive stylus applications. It should also be noted that the same assembly (e.g., the processing device 110) used for the capacitive sense array 128, which is configured to detect touch objects 140, is also used to detect and track the stylus 130 without an additional PCB layer for inductively tracking the active stylus 130.

In some implementations, the processing device 110 includes analog and/or digital general purpose input/output ("GPIO") ports 107. The GPIO ports 107 may be programmable. The GPIO ports 107 may be coupled to a Programmable Interconnect and Logic ("PIL"), which acts as an interconnect between the GPIO ports 107 and a digital block array of the processing device 110 (not shown). In some implementations, the digital block array is configured to implement a variety of digital logic circuits (e.g., DACs, digital filters, or digital control systems) using configurable user modules ("UMs"). The digital block array may be coupled to a system bus. The processing device 110 may also include memory, such as random access memory ("RAM") 105 and non-volatile memory ("NVM") 104. The RAM 105 may be static RAM ("SRAM"). The non-volatile memory 104 may be flash memory, which may be used to store firmware (e.g., control algorithms executable by processing core 109 to implement operations described herein). The processing device 110 may also include a memory controller unit ("MCU") 103 coupled to the memory and the processing core 109. The processing core 109 is a processing element configured to execute instructions or perform operations. The processing device 110 may include other processing elements as would be appreciated by one of ordinary skill in the art having the benefit of this disclosure. It should also be noted that the memory may be internal to the processing device 110 or external to it. In the case of the memory being internal, the memory may be coupled to a processing element, such as the processing core 109. In the case of the memory being external to the processing device 110, the processing device 110 is coupled to the other device in which the memory resides as would be appreciated by one of ordinary skill in the art having the benefit of this disclosure.

Some or all of the operations of the processing core 109 may be implemented in firmware, hardware, software, or some combination thereof. The processing core 109 may receive signals from the capacitance sense circuit 101, determine the state of the capacitive sense array 128 (e.g., determining whether an object is detected on or in proximity to the touch sensing surface), resolve where the object is on the sense array (e.g., determining the location of the object), track the motion of the object, or generate other information related to an object detected at the touch sensor. In some implementations, the processing core 109 includes the capacitance sense circuit 101. In some implementations, the processing core 109 performs some or all the functions of capacitance sense circuit 101. Additionally, in some implementations, the processing core 109 provides display information to the pixel drive circuit 102, such that the pixel drive circuit 102 can be configured to drive individual display pixels in the display device 125 to display images or videos based on the display information. In some implementations, the processing core 109 includes some or all functions of the pixel drive circuit 102 (e.g., part or all of the pixel drive circuit 102 is integrated into the processing core 109).

In some implementations, the processing core 109 generates a touch detection enable signal 120 and a display driving enable signal 121, which are synchronized to control the capacitance sensing circuit 101 and the pixel drive circuit 102 to detect touch locations and drive individual display pixels, respectively. The touch detection enable signal 120 is used to enable a touch sensing state. In the touch sensing state, the display or common electrodes, if shared with the capacitive sense array 128, are decoupled from the pixel drive circuit 102 and reconfigured to the capacitive sense array 128 coupled to the capacitance sense circuit 102. Self or mutual capacitance of sense elements of the capacitive sense array 128 is scanned by the capacitance sense circuit 102. One or more touch locations are thereby detected if one or more objects touch the touch sensing surface of the electronic device 100. Alternatively, in some implementations, the display driving enable signal 121 is used to enable a display driving state (e.g., decouple the capacitance sense circuit 101 from the capacitive sense array 128 and couple the pixel drive circuit 102 to the common electrodes). In such a display driving state, the pixel drive circuit 102 enables a bias voltage and a reference voltage corresponding to an intended color on each display pixel of the display pixel array. The display pixel displays the intended color when the bias voltage and the reference voltage are applied on the display electrode and the common electrode of the respective display pixel. It is noted that the touch detection enable signal 120 and the display driving enable signal 121 can be enabled sequentially and share operation time of electrodes that are shared by the display pixel array and the capacitive sense array.

The processing device 110 may also include an analog block array (not shown) (e.g., field-programmable analog array). The analog block array is also coupled to the system bus. An analog block array may be configured to implement a variety of analog circuits (e.g., ADCs or analog filters) using, in some implementations, configurable UMs. The analog block array may also be coupled to the GPIO 107.

In some implementations, the capacitance sense circuit 101 is integrated into the processing device 110. In some implementations, the capacitance sense circuit 101 (also called a touch controller) is a discrete component distinct from the processing device 110. The capacitance sense circuit 101 includes analog I/O for coupling to an external component, such as a touch-sensor pad (not shown), a capacitive sense array 128, a touch-sensor slider (not shown), a touch-sensor buttons (not shown), and/or other devices. The capacitance sense circuit 101 may be configured to measure capacitance using mutual-capacitance sensing techniques, self-capacitance sensing technique, charge-coupling techniques, charge balancing techniques, or the like. In some implementations, the capacitance sense circuit 101 operates using a charge accumulation circuit, a capacitance modulation circuit, or other capacitance sensing methods known by those skilled in the art. In some implementations, other capacitance sensing circuits may be used. The mutual capacitive sense arrays, or touch screens, as described herein, may include a transparent, conductive sense array disposed on, in, or under either a visual display itself (e.g. a liquid crystal display (LCD) monitor) or a transparent substrate in front of the display.

A capacitive sense array 128 includes a plurality of capacitive sense elements. When a touch object, such as a finger 140 or stylus 130, approaches the capacitive sense array 128, the object causes a decrease in mutual capacitance of some of the sense elements. In some implementations, the presence of a finger increases the capacitance of the electrodes to the environment (Earth) ground, typically referred to as self-capacitance change. In some implementations, the sense elements of the capacitive sense array 128 are configured to operate as transmit (TX) electrodes and receive (RX) electrodes of a mutual capacitive sense array in a first mode to detect touch objects, and to operate as electrodes of a coupled-charge receiver in a second mode to detect a stylus on the same electrodes of the sense array. Specifically, in the first mode, a mutual capacitance is measured at an intersection of a RX electrode (e.g., a row electrode) and a TX electrode (e.g., a column electrode) when a transmit signal is coupled to the TX electrode. Utilizing the change in mutual capacitance, the location of the finger on the capacitive sense array 128 is determined by identifying an RX electrode having a decreased coupling capacitance with a TX electrode whose signal was applied at the time the decreased capacitance is measured on the RX electrode. Therefore, the locations of one or more touch objects can be determined by sequentially scanning the capacitances associated with the intersection of row and column electrodes. In some implementations, in the second mode, the stylus 130 is activated to generate a stylus transmit signal, which is then coupled to a subset of sense elements (more specifically, row and column electrodes) of the capacitive sense array 128 that is located below the stylus 130.

In some implementations, the processing device 110 calibrates the sense elements (intersections of RX and TX electrodes) by determining baselines for the sense elements. In some implementations, interpolation is used to detect finger position at better resolutions than a spatial pitch of the sense elements of the capacitive sense array 128, and various types of coordinate interpolation algorithms are optionally used to detect a center location of a touch.

The processing device 110 may include internal oscillator/clocks 106 and a communication block ("COM") 108. In some implementations, the processing device 110 includes a spread-spectrum clock (not shown). The oscillator/clocks 106 provides clock signals to one or more of the components of processing device 110. The communication block 108 may be used to communicate with an external component, such as an application processor 150, via an application interface ("I/F") line 151. In some implementations, the processing device 110 may also be coupled to an embedded controller 154 to communicate with the external components, such as a host 150. In some implementations, the processing device 110 is configured to communicate with the embedded controller 154 or the host 150 to send and/or receive data.

The processing device 110 may reside on a common carrier substrate such as an integrated circuit ("IC") die substrate, a multi-chip module substrate, or the like. In some implementations, the components of the processing device 110 includes one or more separate integrated circuits and/or discrete components. In some implementations, the processing device 110 includes one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

It is also noted that the implementations described herein are not limited to having a configuration of a processing device 110 coupled to an application processor, but may include a system that measures the capacitance on the capacitive sense array and sends the raw data to a host computer 150, which analyzes the raw data in an application 152. In effect, the processing that is done by the processing device 110 may also be done in the application processor or the application 152 of the host computer 150. Specifically, in some implementations, instead of performing the operations of the processing core 109 locally, the processing device 110 may send the raw data or partially-processed data to the host 150. The host 150, as illustrated in FIG. 1, may include decision logic 153 that performs some or all of the operations of the processing core 109. Operations of the decision logic 153 may be implemented in firmware, hardware, software, or a combination thereof. The host 150 may include a high-level Application Programming Interface (API) in the applications 152, which perform routines on the received data, such as compensating for sensitivity differences, other compensation algorithms, baseline update routines, start-up and/or initialization routines, interpolation operations, or scaling operations. The operations described with respect to the processing core 109 may be implemented in the decision logic 153, the applications 152, or in other hardware, software, and/or firmware external to the processing device 110. In some other implementations, the processing device 110 includes the host 150.

The capacitance sense circuit 101 may be integrated into the IC of the processing device 110, or in a separate IC (for example, in a touch controller). In some implementations, programs enabling functions of the capacitance sense circuit 101 may be generated and compiled for incorporation into other integrated circuits. For example, behavioral level code describing the capacitance sense circuit 101, or portions thereof, may be generated using a hardware descriptive language, such as VHDL or Verilog, and stored to a machine-accessible medium (e.g., CD-ROM, hard disk, floppy disk, or flash memory). Furthermore, the behavioral level code can be compiled into register transfer level ("RTL") code, a netlist, or a circuit layout, and stored onto a machine-accessible medium. The behavioral level code, the RTL code, the netlist, and the circuit layout may represent various levels of abstraction to describe and control the functions of the capacitance sense circuit 101.

It is noted that the components of the electronic device 100 may include all the components described above. In some implementations, the electronic device 100 includes fewer than all of the components described above.

In some implementations, the electronic device 100 is used in a tablet computer. In some implementations, the electronic device 100 is used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a global position system ("GPS"), or a control panel. The implementations described herein are not limited to touch screens or touch-sensor pads for notebook implementations. Implementations can be used in other capacitive sensing devices, such as a touch-sensor slider (not shown) or touch-sensor buttons (e.g., capacitance sensing buttons). In some implementations, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these capacitive sensing implementations may be used in conjunction with non-capacitive sensing elements, including pick buttons, sliders (e.g., display brightness and contrast), scrollwheels, multi-media control (e.g., volume, track advance), handwriting recognition, and numeric keypad operation.

In some implementations, the electronic device 100 further includes one or more alternative sense elements 156 configured to communicate with the processing device 110 via a bus 157. Each alternative sense element 156 is optionally a capacitance based sensor or a non-capacitance sensor. Example alternative sense elements 156 include, but are not limited to, an ambient light sensor, a capacitive touch button, and a side touch sensor.

FIG. 2A shows an example electronic device 200 having a bezel 202 surrounding an active display area of a touch display screen 204 in accordance with some implementations. FIG. 2B is an exploded view of the touch display screen 204 of the electronic device 200, including a plurality of structural layers in accordance with some implementations. In some implementations, the bezel 202 has a bezel width that varies between the four sides of the touch display screen 204 (e.g., the left bezel width 202A and the right bezel width 202B are less than the bottom bezel width 202C. Typically, the bezel width is identical on the left side and on the right side of the touch display screen 204. In some implementations, the bezel width is reduced below a threshold width at least on the left side and on the right side of the touch display screen 204. In some implementations, the bezel width is reduced below a threshold width at all four sides of the touch display screen 204. For example, an industrial definition for a bezel-less electronic device requires the threshold width to be less than 2 mm, and the bezel width has to be reduced below 2 mm at all four sides of the touch display screen 204. In some examples, a cathode ray tube has a bezel width of two inches or more, and an LCD display has a bezel width less than one inch. A small bezel width (e.g., less than 2 mm) makes the active display area of the touch display screen 204 look larger, and multiple touch display screens 204 look more like a single screen when placed side by side.

Referring to FIG. 2B, the plurality of structural layers of the touch display screen 204 include a touch detection assembly 206 that is protected by a top glass or dielectric layer 214. The touch detection assembly 206 includes a first electrode layer 208 and a second electrode layer 210, which are separated by an intermediate glass or dielectric layer 212. One of the first and second electrode layers is configured to form a plurality of row electrodes, and the other one of the first and second electrode layers is configured to form a plurality of column electrodes. A sensor pattern is constructed by the plurality of row and column electrodes to form the capacitive sense array 128. The row and column electrodes (i.e., the sensor pattern) are formed on a bottom surface and a top surface of the intermediate glass or dielectric layer 212. In some implementations, each of the row and column electrodes is used as a capacitive sense element, and self capacitance is measured for the respective row or column electrode by the capacitance sense circuit 101. In some implementations, a capacitive sense element is formed at an intersection of a row electrode and a column electrode, and mutual capacitance is measured between the row and column electrodes by the capacitance sense circuit 101. Specifically, a transmit signal is provided by the capacitance sense circuit 101 to drive the row electrode, and a capacitive sense signal is measured from the column electrode to determine the mutual capacitance associated with this capacitive sense element. In some implementations, optically clear adhesive (OCA) is used to bond the top glass or dielectric layer 214 to the surface of the intermediate glass or dielectric layer 212 on which the second electrode layer 210 is constructed, thus protecting the row or column electrodes formed on the second electrode layer 210.

In some implementations, the display area of the electronic device 200 further includes a bottom glass or dielectric layer 216 and/or an electric shielding 218, which are disposed under the touch detection assembly 206 to support the capacitive sense array 128 mechanically and shield the capacitive sense array 128 from electrical noises.

In some implementations, the touch display screen 204 of the electronic device 200 further includes an LCD layer (not shown in FIG. 2B). In the stack shown in FIG. 2B, the LCD layer may be placed preferably under the touch detection assembly 206, and in some implementations, it is placed between the top glass or dielectric layer 214 and the touch detection assembly 206. A display electrode layer and a common electrode layer are applied directly above and below the LCD display to form display electrodes and common electrodes applied to drive LCD display cells in the LCD display. In some implementations, the first electrode layer, the second electrode layer, the display electrode layer, and the common electrode layer are distinct from each other. In some implementations, one of the first and second electrode layers is used as the display or common electrode layer. For example, when the LCD layer is disposed below the touch detection assembly 204, the first electrode layer 208 is optionally used as the display electrode layer, and the row or column electrodes made from the first electrode layer 208 may be reconfigured to the display electrodes of the display electrode layer to drive the LCD display cells formed in the LCD layer.

In the capacitive sense array 128, the plurality of row electrodes and the plurality of column electrodes are formed on two conductive layers (i.e., electrode layers 208 and 210) that are electrically insulated from each other by the intermediate glass or dielectric layer 212, and therefore, each of the conductive layers is formed on one of the top or bottom surfaces of the intermediate glass or dielectric layer 212. In some implementations, the first electrode layer 208 and the second electrode layer 210 are substantially transparent. In particular, when the touch detection assembly 206 is disposed on top of the LCD layer, the transparent electrode layers of the capacitive sense array 128 let light pass without compromising the quality of images displayed via the LCD layer.

A two-dimensional array of capacitive sense elements is formed in the capacitive sense array 128 using the first and second electrode layers, and the resolution of the capacitive sense array 128 is represented as a product of the number of columns and the number of rows of capacitive sense elements. In an example, the touch display screen 204 is a 5.5 inch display screen (i.e., the length of its diagonal is 5.5 inches) having a size of 62.5×125 mm² and an aspect ratio of 2:1. The corresponding capacitive sense array 128 has 28 rows and 14 columns of capacitive sense elements, so each sense element located at an intersection of a row and a column has a size of 4×4 mm². The number of intersections is 28×14, and the resolution of the capacitive sense array 128 is 28×14.

When the capacitance sense circuit 101 is placed at a top side or a bottom side of the touch display screen 204, a first plurality of routing traces are disposed on the substantially narrow bezel 202A or 202B to connect the row electrodes to the capacitance sense circuit 101. The first plurality of routing traces has a feature trace width and is separated by spacing having a feature spacing size. Each routing trace is wider than the feature trace width and separated from an adjacent routing trace by a space larger than the feature spacing size. The substantially narrow bezel 202A or 202B has a bezel width, and can only fit a limited number of routing traces having the feature trace width and the feature spacing size. For example, the 28 routing traces have a feature trace size of 50 μm and a feature spacing size of 50 μm. Only 10 or less routing traces can be fit in a bezel width of 1 mm. If the 28×14 capacitive sense array corresponds to 28 row electrodes accessed by 28 routing traces (e.g., according to a Manhattan configuration), the bezel width of 1 mm is not sufficient to accommodate the 28 routing traces even if both bezels 202A and 202B are used to arrange the 28 routing traces.

FIG. 3A is a top view of an example capacitive sense array 300 integrated in a touch display screen 204 of an electronic device 200 in accordance with some implementations. FIG. 3B is a perspective view of another example capacitive sense array 350 integrated in a touch display screen 204 of an electronic device 200 in accordance with some implementations. Each of the capacitive sense arrays 300 and 350 includes a two-dimensional array of capacitive sense elements arranged according to a standard Manhattan configuration. In accordance with the standard Manhattan configuration, each capacitive sense element is disposed at an intersection of a row electrode and a column electrode and has a size of p×p, and both the row and the column electrodes have the same pitch p. A flexible printed circuit (FPC) is integrated in a bottom area that is outside the active display area and in proximity to a bottom side of the touch display screen 204, and the column electrodes are directly coupled to the FPC in the bottom area. However, the row electrodes have to be coupled to a number of routing traces disposed on the left bezel 202A and/or the right bezel 202B of the touch display screen, and the number of row electrodes is equal to the number of routing traces.

Referring to FIG. 3A, the resolution of the example capacitive sense array 300 is 16×8, and the example capacitive sense array 300 includes 16 row electrodes and 8 column electrodes. Both the row and column electrodes cover a substantially large area (e.g., >90%) of each sense element. In some implementations, the row and column electrodes have the same width. Referring to FIG. 3B, the resolution of the example capacitive sense array 350 is 7×7, and the example capacitive sense array 350 includes 7 row electrodes and 7 column electrodes. The row electrodes cover a substantially large area (e.g., >90%) of each capacitive sense element, and each of the column electrodes includes a plurality of fingers covering a portion (e.g., 20%) of each capacitive sense element in total. For each column electrode, the plurality of fingers are optionally connected at a first end 302A, a middle portion, or a second end 302B of the respective column electrode. For each capacitive sense element in the capacitive sense arrays 300 and 350, a transmit signal is provided by the capacitance sense circuit 101 to drive its row electrode, and a capacitive sense signal is measured from its column electrode to determine the mutual capacitance associated with the respective capacitive sense element. In some situations, the column electrodes of the example capacitive sense array 350 have a relatively open structure compared with the capacitive sense array 300, so it is more sensitive and responsive to an object that comes into contact or close proximity with the capacitive sense array.

FIG. 4A is a top view of an example capacitive sense array 400 integrated in a touch display screen 204 of an electronic device 200 in accordance with some implementations. FIG. 4B is a two-dimensional sub-array of capacitive sense elements corresponding to a row electrode 402 of the example capacitive sense array 400 shown in FIG. 4A. FIG. 4C is a pair of capacitive sense elements in the example capacitive sense array 400 shown in FIG. 4A. The capacitive sense array 400 includes a two-dimensional array of capacitive sense elements arranged according to a modified Manhattan configuration. At least a subset of the row electrodes 402 (e.g., half of the electrodes 402) in the first electrode layer 208 are configured to be accessed from a first edge (e.g., the left bezel 202A) of the capacitive sense array 400, and the column electrodes 404 and 406 in the second electrode layer are arranged in interleaved pairs. The column electrodes are accessed from a second edge (e.g., the bottom side 202C) of the capacitive sense array, which is perpendicular to the first edge. A first plurality of routing traces is disposed on the first edge to access the subset of row electrodes 402 of the array of capacitive sense elements, and the first plurality of routing traces is configured to electrically couple a touchscreen controller (e.g., including the capacitance sense circuit 101) to the row electrodes 402 of the array of capacitive sense elements. A second plurality of routing traces is disposed on the second edge to access the column electrodes 404 and 406 of the array of capacitive sense elements, and the second plurality of routing traces is configured to electrically couple the touchscreen controller to the column electrodes of the array of capacitive sense elements.

Referring to FIG. 4A, in accordance with the modified Manhattan configuration, each capacitive sense element is disposed at an intersection of a row electrode 402 and a column electrode 404 or 406 and has a size of p×p. However, the row and column electrodes do not have the same pitch of p. Rather, each row electrode 402 covers multiple rows of capacitive sense elements, and each column of capacitive sense elements is associated with two or more interdigitated column electrodes 404 and 406. In this example shown in FIGS. 4A-4C, each row electrode 402 covers two rows of capacitive sense elements, and the column electrodes 404 and 406 are organized into pairs. Each pair of column electrodes 404 and 406 is interleaved. As a result, the resolution of the example capacitive sense array 400 is still 16×8. However, the capacitive sense array 400 has 8 row electrodes and 16 column electrodes. The number of row electrodes 402 is cut by half while the number of column electrodes 404 and 406 is doubled compared with the numbers of electrodes in a standard Manhattan configuration (FIG. 3A). All of the capacitive sense elements have widths and heights that are substantially equal, but the pitch of the row electrodes 402 doubles the pitch of the sense elements, and the pitch of the column electrode pairs is the same as the pitch of the capacitive sense elements (the equivalent pitch of the column electrodes 404 and 406 is half of the pitch of the capacitive sense elements, namely p/2).

A flexible printed circuit (FPC) is integrated in a bottom area that is outside the active display area and is in proximity to a bottom side of the touch display screen 204. The 16 column electrodes are directly coupled to the FPC in the bottom area. The row electrodes 402 are coupled to a first plurality of routing traces disposed on the left bezel 202A, the right bezel 202B, or both bezels of the touch display screen 204, and the number of row electrodes 402 and the number of the first plurality of routing traces are reduced (e.g., to 8). In some implementations, the reduced number of routing traces can therefore fit into a substantially narrower bezel that is too small to accommodate the routing traces if the number of traces is not reduced. In particular, if the trace size and the spacing size of the routing traces do not change, and are greater than the feature trace size and the feature spacing sizing, they would not fit. In some implementations, all of the routing traces can fit into a single side of the substantially narrow bezel because the number of routing traces has been reduced.

In some implementations, the first edge (e.g., the left bezel 202A) can only accommodate a threshold number (M) of routing traces according to the bezel width of the bezel 202, and the feature trace size and the feature spacing size of the first plurality of routing traces is configured to access the row electrodes 402. If all routing traces configured to access the row electrodes 402 are disposed on the first edge, the number of the row electrodes 402 cannot exceed M in both the standard and modified Manhattan configurations. If half of all the routing traces configured to access the row electrodes 402 are disposed on the first edge, the number of the row electrodes 402 cannot exceed 2M.

Referring to FIG. 4B, each row electrode 402 formed in the first electrode layer corresponds to a two-dimensional sub-array of capacitive sense elements that has n rows (e.g., 2 rows) of capacitive sense elements. For each row electrode 402, the two-dimensional sub-array of capacitive sense elements has n rows (e.g., 2 rows) rows of sense elements. For each column of sense elements, a transmit signal is provided by the capacitance sense circuit 101 to drive its row electrode 402, and n capacitive sense signals (e.g., two signals) are measured from n column electrodes (e.g., two column electrodes 404 and 406) to determine the mutual capacitance associated with n capacitive sense elements corresponding to an intersection of the row electrode 402 and the corresponding column. In this example, at each intersection of a row electrode 402 and a column of sense elements, two capacitive sense signals are measured from an upper sense element and a lower sense element, respectively.

The column electrodes 404 and 406 have an identical shape, and each column electrode 404 has a 180-degree rotational symmetry with respect to its neighboring column electrode 406. Referring to FIG. 4C, each column electrode 404 extends from a first routing trace 404A to cover at least part of a first half of a height of each row electrode 402, and interleaves with a respective neighboring column electrode 406. The respective neighboring column electrode 406 extends from a second routing trace 406A to cover at least part of a second half of the height of each row electrode 402 that does not overlap. The column electrode 406 is optionally complementary to the first half of the height of each row electrode 402. It is noted that the width and the height of each capacitive sense element has to be slightly reduced to spare space for the routing trace 404A and 406A and a separation between the upper and lower sense elements. Thus, each capacitive sense element in the modified Manhattan configuration covers a smaller area than each capacitive sense element in the standard Manhattan configuration.

FIG. 5A is a top view of an example capacitive sense array 500 integrated in a touch display screen 204 of an electronic device 200 in accordance with some implementations. FIG. 5B is a two-dimensional sub-array of capacitive sense elements corresponding to a row electrode 502 of the example capacitive sense array 500 shown in FIG. 5A in accordance with some implementations. FIG. 5C is a pair of sense element in the example capacitive sense array 500 shown in FIG. 5A. The capacitive sense array 500 includes a two-dimensional array of capacitive sense elements arranged according to a modified Manhattan configuration. In accordance with the modified Manhattan configuration, each capacitive sense element is disposed at an intersection of a row electrode 502 and a column electrode 504 or 506 and has a size of p×p. Each row electrode 502 covers multiple rows of capacitive sense elements, and each column of capacitive sense elements is associated with two or more interdigitated column electrodes 504 and 506. In this example shown in FIGS. 5A-5C, each row electrode 502 covers two rows of capacitive sense elements, and column electrodes 504 and 506 are organized into pairs. Each pair of column electrodes 504 and 506 is interleaved. As a result, the resolution of the example capacitive sense array 500 is still 16×8. However, the capacitive sense array 500 has 8 row electrodes and 16 column electrodes. That is, the number of row electrodes 502 is cut by half while the number of column electrodes 504 and 506 is doubled compared with the electrodes in a standard Manhattan configuration. Each of the capacitive sense elements has a width and a height that are substantially equal. However, the pitch of the row electrodes 502 doubles the pitch of the capacitive sense elements and the pitch of the column electrode pairs is the same as the pitch of the capacitive sense elements (the equivalent pitch of the column electrodes 504 and 506 is half of the pitch of the capacitive sense elements, namely p/2).

The column electrodes 504 and 506 have an identical shape, and each column electrode 504 has a 180-degree rotational symmetry with respect to each neighboring column electrode 506. Referring to FIG. 5C, each column electrode 504 extends from a first routing trace 504A to cover at least part of a first half of the height of each row electrode 502, and interleaves with a respective neighboring column electrode 506. The respective neighboring column electrode 506 extends from a second routing trace 506A to cover at least part of a second half of the height of each row electrode 502, which does not overlap, but is complementary to the first half of the height of each row electrode 502.

In some implementations, for each row electrode 502, a corresponding portion of each column electrode 504 includes a plurality of finger elements 504B-504E, which extend from the first routing trace 504A to cover the first half of the height of the corresponding row electrode 502. Likewise, a portion of the respective neighboring column electrode 506 includes a plurality of finger elements 506B-506E, which extend from the second routing trace 506A to cover the second half of the height of the corresponding row electrode 502. In some situations, the finger elements 504B-504E are distributed evenly on top of a top half of the height of the corresponding row electrode and covers part (e.g. 30%) of the area of the top half, and the finger elements 506B-506E are distributed evenly on top of a bottom half of the height of the corresponding row electrode and cover part (e.g. 30%) of the area of the bottom half. Under some circumstances, the column electrodes 504 and 506 of the example capacitive sense array 500 have a relatively open structure compared with the capacitive sense array 400, and therefore, is more sensitive and responsive to an object that comes into contact or close proximity with the capacitive sense array.

Figure 6B:
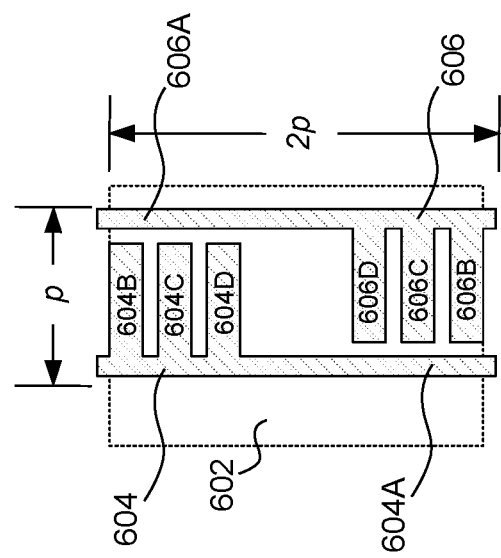
FIG. 6B is a symmetric pair of sense elements in the example capacitive sense array shown in FIG. 6A in accordance with some implementations.
Figure 6A:
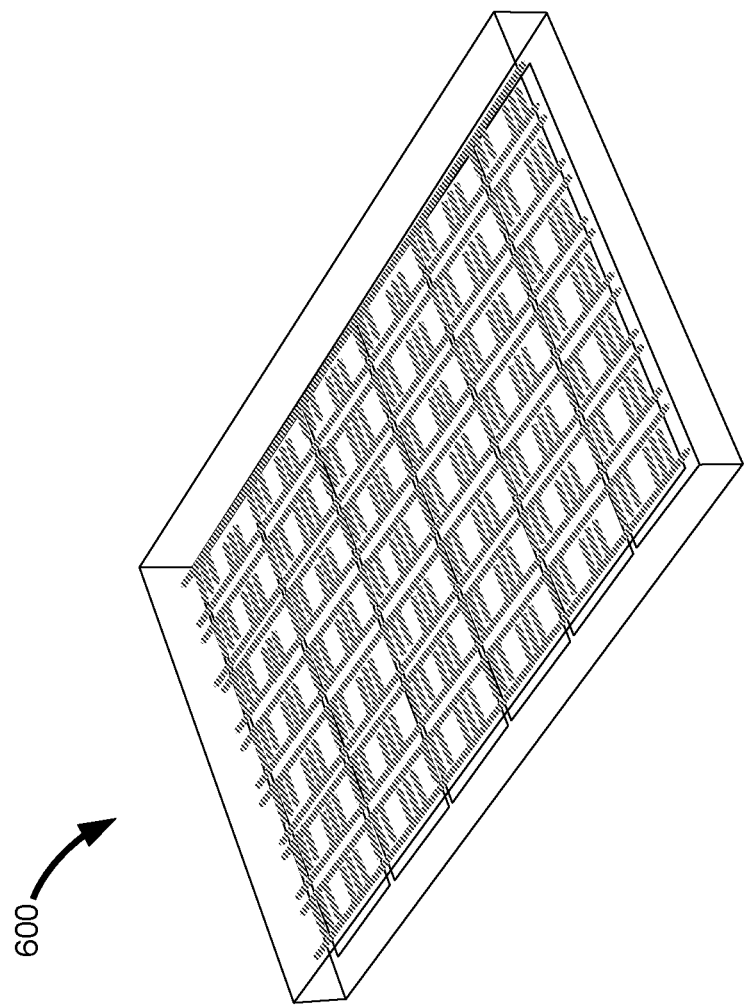
FIG. 6A is a perspective view of an example capacitive sense array integrated in a touch display screen of an electronic device in accordance with some implementations.

FIG. 6A is a perspective view of an example capacitive sense array 600 integrated in a touch display screen 204 of an electronic device 200 in accordance with some implementations, and FIG. 6B is a pair of sense elements in the example capacitive sense array 600 shown in FIG. 6A. The capacitive sense array 600 includes a two-dimensional array of capacitive sense elements arranged according to a modified Manhattan configuration. In accordance with the modified Manhattan configuration, each capacitive sense element is disposed at an intersection of a row electrode 602 and a column electrode 604 or 606 and has a size of p×p. Each row electrode 602 covers two rows of capacitive sense elements, and the column electrodes 604 and 606 are organized into pairs. The column electrodes 604 and 606 are interleaved. As a result, the resolution of the example capacitive sense array 600 is still 16×8. However, the capacitive sense array 600 has 8 row electrodes and 16 column electrodes. That is, the number of row electrodes 602 is cut by half while the number of column electrodes 604 and 606 is doubled compared with the numbers of electrodes in a standard Manhattan configuration (FIG. 3A). The capacitive sense elements have widths and heights that are substantially equal, but the pitch of the row electrodes 502 doubles the pitch of the sense elements, and the pitch of the column electrode pairs is the same as the pitch of the capacitive sense elements. The equivalent pitch of the column electrodes 604 and 606 is half of the pitch of the capacitive sense elements.

The column electrodes 604 and 606 have an identical shape, and each column electrode 604 has a 180-degree rotational symmetry with respect to each neighboring column electrode 606. Each column electrode 604 extends from a first routing trace 604A to cover at least part of a first half of a height of each row electrode 602, and interleaves with a respective neighboring column electrode 606. The respective neighboring column electrode 606 extends from a second routing trace 606A to cover at least part of a second half of the height of each row electrode 602 that does not overlap, but is optionally complementary to, the first half of the height of each row electrode 602. In this example, the column electrode 604 extends from the first routing trace 604A to cover a top ⅓ of a height of each row electrode 602, and the respective neighboring column electrode 604 that interleaves with the row electrode 602 extends from the second routing trace 606A to cover a bottom ⅓ of the height of the row electrode 602.

In some implementations, for each row electrode 602, a portion of each column electrode 604 includes a plurality of finger elements 604B-604D that extend from the first routing trace 604A to cover the top ⅓ of the height of the corresponding row electrode 602. Likewise, a portion of the respective neighboring column electrode 606 includes a plurality of finger elements 606B-606D that extend from the second routing trace 606A to cover the bottom ⅓ of the height of the corresponding row electrode 602.

It should be understood that the particular electrode configuration in each of FIGS. 3A-3B, 4A-4C, 5A-5C, and 6A-6B are exemplary, and do not indicate that the described electrode pattern is the only electrode pattern in which the column electrodes of the capacitive sense arrays 128 could have. One of ordinary skill in the art would recognize that various electrode patterns can implement the column electrodes of the capacitive sense arrays 128 based on what is described herein. Additionally, it should be noted that details of the electrode configuration described with respect to each of FIGS. 3A-3B, 4A-4C, 5A-5C, and 6A-6B are also applicable in an analogous manner to the electrode configurations described with respect to other figures in FIGS. 3A-3B, 4A-4C, 5A-5C and 6A-6B. For brevity, these details are not repeated in each of these figures.

Figure 7A:
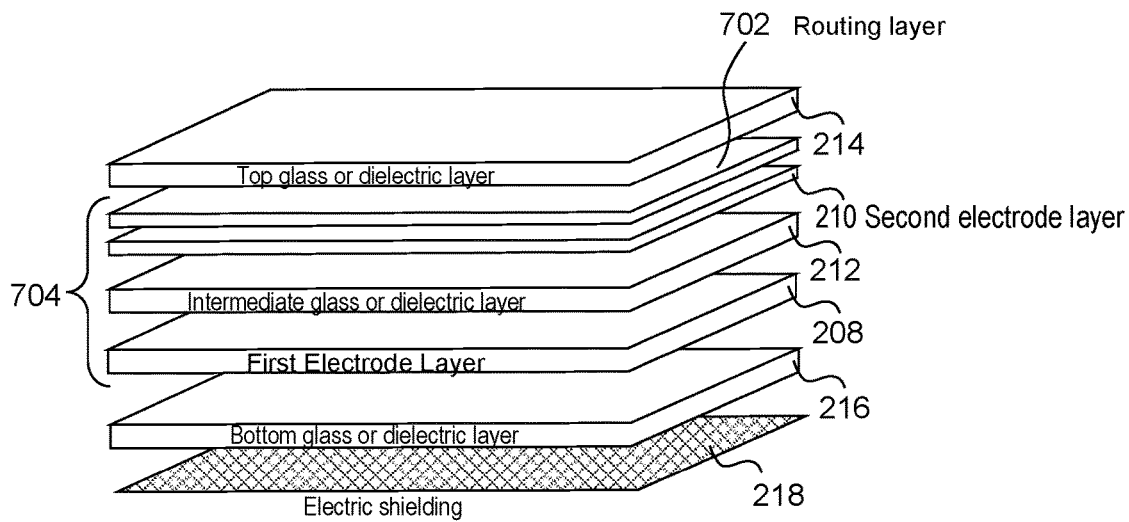
FIG. 7A is an exploded view of a touch display screen of an electronic device including at least three metal layers (a routing layer and two electrode layers) in a touch detection assembly in accordance with some implementations.
Figure 7B:
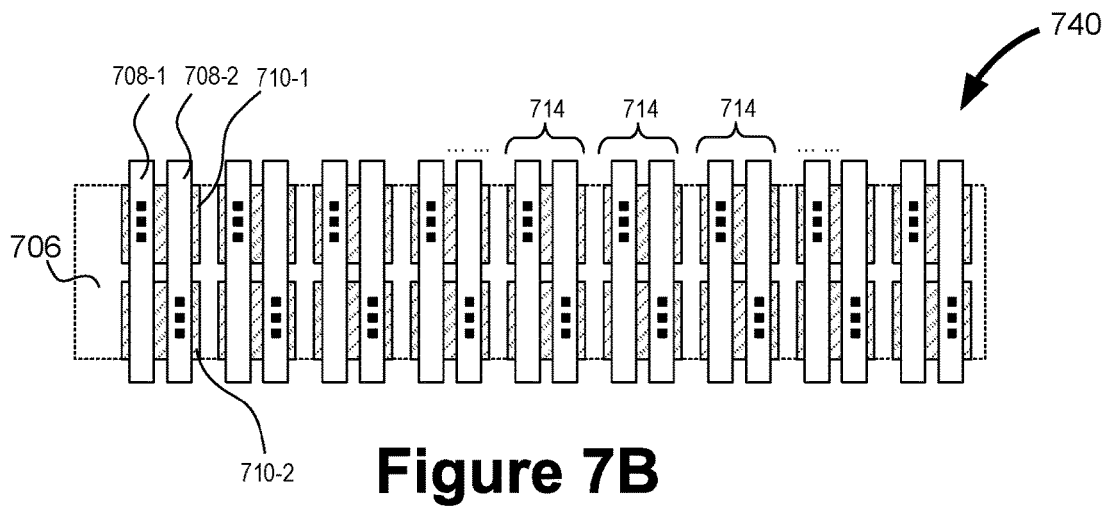
FIGS. 7B and 7C are two-dimensional sub-arrays and of capacitive sense elements corresponding to a row electrode of a capacitive sense array in accordance with some implementations of the application.
Figure 7C:
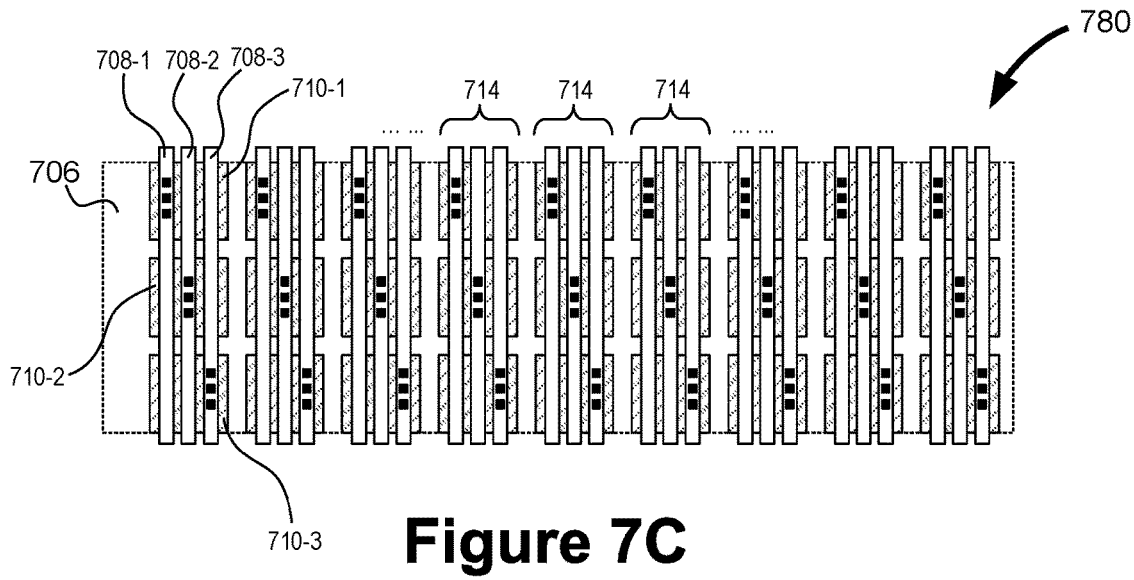

FIG. 7A is an exploded view of a touch display screen 204 of an electronic device 200 including at least three metal layers (a routing layer 702 and two electrode layers 208 and 210) in a touch detection assembly 704 in accordance with some implementations. FIGS. 7B and 7C are two-dimensional sub-arrays 740 and 780 of capacitive sense elements corresponding to a row electrode 706 of a capacitive sense array 128 in accordance with some implementations. Unlike the touch detection assembly 206, the touch detection assembly 704 includes the routing layer 702 in addition to the first electrode layer 208 and the second electrode layer 210. The routing layer 702 is disposed above the second electrode layer 210, and configured to provide additional routing to column electrodes formed on the second electrode layer 210. A capacitive sense array 128 made from the touch detection assembly 704 includes a two-dimensional array of capacitive sense elements arranged according to a modified Manhattan configuration. In accordance with the modified Manhattan configuration, each capacitive sense element is disposed at an intersection of a row electrode 702 and a column electrode and has a size of p×p. Each row electrode 706 forms n rows of capacitive sense elements (e.g., two rows in FIG. 7B and three rows in FIG. 7C) at intersections with the column electrodes 708. Each column of the capacitive sense elements comprises n interdigitated column electrodes (e.g., two column electrodes in FIG. 7B and three column electrodes in FIG. 7C).

Figure 7D:
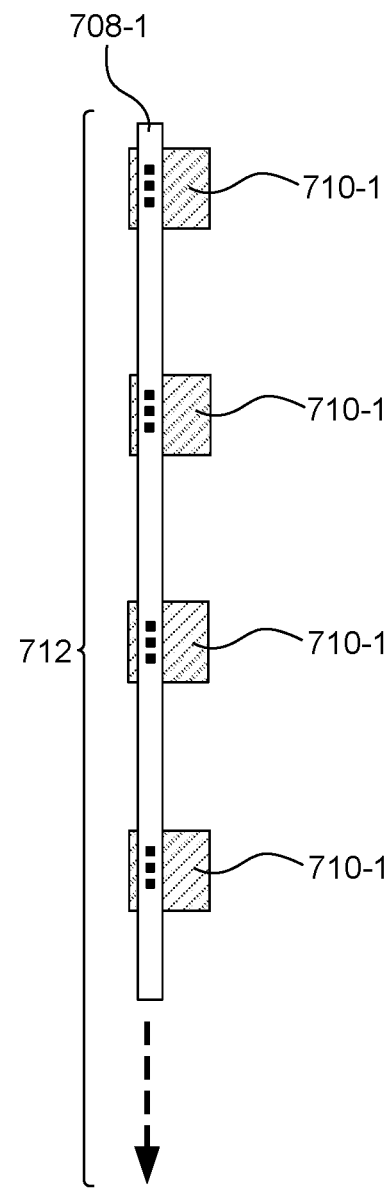
FIG. 7D illustrates a single column electrode corresponding to either FIG. 7B or FIG. 7C.

Specifically, each column of the capacitive sense elements corresponds to n column traces 708 formed in the routing layer 702. Each capacitance sense element has a column electrode pad 710 that is formed in the second electrode layer and electrically coupled to a column trace 708. A column trace 708 together with all of its column electrode pads 710 comprises a column electrode 712, as illustrated in FIG. 7D. Each row electrode 706 forms n rows of capacitive sense elements at intersections with the column electrode pads 710. Every n column traces 708 are grouped into a column trace set that is configured to drive a column of capacitive sense elements corresponding to the respective row electrode 706.

Referring to FIG. 7B, each row electrode 706 covers two rows of capacitive sense elements, and the column traces 708 are organized into pairs 714. Each pair of column electrodes 712 has interleaved column electrode pads 710, and each column electrode 712 includes a routing trace 708 and a plurality of column electrode pads 710 (each of which corresponds to a row electrode). For each column of sense elements, two routing traces 708-1 and 708-2 are formed in the routing layer 702. They are connected to an upper electrode pad 710-1 and a lower electrode pad 710-2 as indicated by the square black dots. The resolution of the example capacitive sense array 740 is the same as the array having a standard Manhattan configuration. However, the number of row electrodes 706 is cut by half while the number of column electrodes 708 is doubled compared with the numbers of electrodes in the standard Manhattan configuration. Stated another way, the capacitive sense elements have widths and heights that are substantially equal. However, the pitch of the row electrodes 702 doubles the pitch of the sense elements, and the pitch of the column electrode pairs is the same as the pitch of the capacitive sense elements. The equivalent pitch of the column electrodes 712 is half of the pitch of the capacitive sense elements, namely p/2). A transmit signal is provided by the capacitance sense circuit 101 to drive the row electrode 706, and a capacitive sense signal is measured from each of the column electrodes 712 to determine the mutual capacitance associated with a corresponding capacitive sense element.

Referring to FIG. 7C, each row electrode 706 covers three rows of capacitive sense elements, and the column electrodes 712 are organized into sets 714. Each set of column electrodes is interleaved, and each column electrode 712 includes a routing trace 708 and a plurality of column electrode pads 710, each of which corresponds to a row electrode. For each column of sense elements, three routing traces 708-1, 708-2, and 708-3 are formed in the routing layer 702. They are connected to an upper electrode pad 710-1, a middle electrode pad 710-2, and a lower electrode pad 710-3. The resolution of the example capacitive sense array 780 is the same as the array having a standard Manhattan configuration. However, the number of row electrodes 706 is cut to a third while the number of column electrodes 712 is tripled compared with the numbers of electrodes in the standard Manhattan configuration. That is, all of the capacitive sense elements in FIG. 7C have substantially the same width and height. However, the pitch of the row electrodes 702 triples the pitch of the sense elements and the pitch of the column electrode pairs is the same as the pitch of the capacitive sense elements. The equivalent pitch of the column electrodes 708 is ⅓ of the pitch of the capacitive sense elements, namely p/3).

In some implementations, the column electrode pads 710 are made of a solid piece of metal covering a substantially large area (e.g., >90%) of the corresponding capacitive sense element. In some implementations, each column electrode pad 710 includes a plurality of fingers distributed over a substantially large area (e.g., >90%) of the corresponding capacitive sense element, and the fingers only cover a portion (20%) of the substantially large area. In some implementations, each column electrode pad 710 has a pattern including a plurality of openings.

In summary, each row electrode in the first electrode layer 208 corresponds to a two-dimensional sub-array of capacitive sense elements that has n rows of capacitive sense elements. In some situations, n is equal to or greater than 3 (FIG. 7C), and the two-dimensional sub-array of capacitive sense elements has three or more rows of sense elements. Each row of sense elements covers at least part of a height of the respective row electrode. A column routing layer 702 includes a plurality of interconnect sets 714, and each interconnect set includes n column interconnects that are electrically coupled to the n rows of capacitive sense elements corresponding to each row electrode.

It should be noted that details of the electrode configuration described with respect to each of FIGS. 3A-3B, 4A-4C, 5A-5C and 6A-6B are also applicable in an analogous manner to the electrode configurations described with respect to FIGS. 7A-7C when applicable. For brevity, these details are not repeated here in FIGS. 7A-7C.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

It will also be understood that, although the terms first and second are used herein to describe various elements, these elements should not be limited by these terms. These terms are only used to distinguish one element from another. For example, a first fastener can be termed a second fastener, and, similarly, a second fastener can be termed a first fastener, without departing from the scope of the various described implementations. The first fastener and the second fastener are both fasteners, but they are not the same fastener.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, components, structures and/or groups, but do not preclude the presence or addition of one or more other features, steps, operations, elements, components, structures, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

What is claimed is:

1. A capacitive sense array, comprising:
a two-dimensional array of capacitive sense elements, each capacitive sense element formed by a respective intersection of (i) a respective row electrode in a first electrode layer and (ii) a respective column electrode in a second electrode layer, wherein:
each column of the capacitive sense elements comprises a respective n column electrodes that are interdigitated with each other and electrically disconnected from each other, n being a positive integer greater than 1, each of the respective n interdigitated electrically disconnected column electrodes intersecting each row electrode in the first electrode layer; and
each row electrode forms n rows of capacitive sense elements at intersections with the column electrodes.

2. The capacitive sense array of claim 1, wherein at least a subset of the row electrodes in the first electrode layer are configured to be accessed from a first edge of the capacitive sense array, and the column electrodes in the second electrode layer are configured to be accessed from a second edge of the capacitive sense array that is perpendicular to the first edge.

3. The capacitive sense array of claim 2, further comprising a first plurality of routing traces disposed on the first edge to access the subset of the row electrodes of the array of capacitive sense elements, wherein the first plurality of routing traces is configured to electrically couple a touchscreen controller to the row electrodes of the array of capacitive sense elements.

4. The capacitive sense array of claim 3, further comprising a second plurality of routing traces disposed on the second edge to access the column electrodes of the array of capacitive sense elements, wherein the second plurality of routing traces are configured to electrically couple the touchscreen controller to the column electrodes of the array of capacitive sense elements.

5. The capacitive sense array of claim 3, wherein:
the capacitive sense array is arranged under a display screen having a bezel width;
the first edge of the capacitive sense array corresponds to the bezel width of the display screen;
the array of capacitive sense elements includes a first number of row electrodes;
the first plurality of routing traces has a feature trace width and is separated by spacing having a feature spacing size; and
the first number is determined according to the bezel width, the feature trace size, and the feature spacing size.

6. The capacitive sense array of claim 5, wherein the display screen has an aspect ratio that is greater than 16:9.

7. The capacitive sense array of claim 5, wherein:
the first edge has a width that can accommodate access to at most a threshold number of row electrodes;
the first number is equal to or less than the threshold number; and
a product of the first number and n is greater than the threshold number.

8. The capacitive sense array of claim 1, wherein the first electrode layer and the second electrode layer are substantially transparent.

9. The capacitive sense array of claim 1, wherein each row electrode in the first electrode layer corresponds to a two-dimensional sub-array of capacitive sense elements that has n rows of capacitive sense elements.

10. The capacitive sense array of claim 9, wherein:
n is equal to 2;
for each row electrode, the two-dimensional sub-array of capacitive sense elements has two rows of sense elements; and
the column electrodes have an identical shape, and each column electrode has a 180-degree rotational symmetry with respect to each neighboring column electrode.

11. The capacitive sense array of claim 10, wherein:
each column electrode extends from a first routing trace to cover at least part of a first half of a height of each row electrode, and interleaves with a respective neighboring column electrode; and
the respective neighboring column electrode extends from a second routing trace to cover at least part of a second half of the height of each row electrode that is complementary to the first half of the height of each row electrode.

12. The capacitive sense array of claim 11, wherein for each row electrode, a portion of each column electrode includes a plurality of finger elements that extend from the first routing trace to cover the at least part of the first half of the height of the corresponding row electrode.

13. The capacitive sense array of claim 9, wherein for each row electrode:
n is equal to or greater than 3; and
the two-dimensional sub-array of capacitive sense elements has three or more rows of sense elements, each covering at least part of a height of the respective row electrode.

14. The capacitive sense array of claim 13, further comprising:
a column routing layer including a plurality of interconnect sets, wherein each interconnect set includes n column interconnects that are electrically coupled to the n rows of capacitive sense elements corresponding to each row electrode, respectively.

15. The capacitive sense array of claim 1, wherein a capacitance sense circuit is configured to be electrically coupled to the capacitive sense array, and measure self capacitance at each of the row and column electrodes to detect a touch event on the capacitive sense array.

16. The capacitive sense array of claim 1, wherein a capacitance sense circuit is configured to be electrically coupled to the capacitive sense array, and measure mutual capacitance of at least one of the capacitive sense elements to detect a touch event on the capacitive sense array.

17. The capacitive sense array of claim 1, wherein a capacitance sense circuit is configured to drive one of the row electrodes with a transmit signal, and measure an output signal at each column electrode to determine a mutual capacitance between the one of the row electrodes and the respective column electrode.

18. The capacitive sense array of claim 1, wherein at least one of the first and second electrode layers is reconfigurable to provide electrodes that drive a display pixel array.

19. An electronic device, comprising:
a two-dimensional array of capacitive sense elements, each capacitive sense element formed by a respective intersection of (i) a respective row electrode in a first electrode layer and (ii) a respective column electrode in a second electrode layer, wherein:

each column of the capacitive sense elements comprises a respective n column electrodes that are interdigitated with each other and electrically disconnected from each other, n being a positive integer greater than 1, each of the respective n interdigitated electrically disconnected column electrodes intersecting each row electrode in the first electrode layer; and each row electrode forms n rows of capacitive sense elements at intersections with the column electrodes.

20. An electronic system, comprising:

a two-dimensional array of capacitive sense elements, each capacitive sense element formed by a respective intersection of (i) a respective row electrode in a first electrode layer and (ii) a respective column electrode in a second electrode layer, wherein:

each column of the capacitive sense elements comprises a respective n column electrodes that are interdigitated with each other and electrically disconnected from each other, n being a positive integer greater than 1, each of the respective n interdigitated electrically disconnected column electrodes intersecting each row electrode in the first electrode layer; and each row electrode forms n rows of capacitive sense elements at intersections with the column electrodes; and a capacitance sense circuit electrically coupled to the two-dimensional array of capacitive sense elements and configured to measure capacitance of at least one of the capacitive sense elements.

\* \* \* \* \*